(12) United States Patent
Higuchi et al.

(10) Patent No.: US 10,948,716 B2
(45) Date of Patent: Mar. 16, 2021

(54) IMAGE DISPLAY DEVICE AND IMAGE DISPLAY METHOD (71) Applicant: RICOH COMPANY, LTD., Tokyo (JP)

(72) Inventors: Miho Higuchi, Kanagawa (JP); Takuro Yasuda, Kanagawa (JP); Daisuke Ichii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/054,501

(22) Filed: Aug. 3, 2018

(65) Prior Publication Data

US 2018/0373027 A1 Dec. 27, 2018

Related U.S. Application Data

(63) Continuation of application No. PCT/JP2017/000854, filed on Jan. 12, 2017.

(30) Foreign Application Priority Data

Feb. 9, 2016 (JP) .............................. JP2016-023027

(51) Int. Cl.
*G02B 27/01* (2006.01)
*B60K 35/00* (2006.01)
(Continued)

(52) U.S. Cl.
CPC .............. *G02B 27/01* (2013.01); *B60K 35/00* (2013.01); *B60R 11/02* (2013.01); *G02B 26/101* (2013.01);
(Continued)

(58) Field of Classification Search
CPC ......... G02B 27/01; B60K 35/00; B60R 11/02; H04N 9/64
See application file for complete search history.

(56) References Cited

U.S. PATENT DOCUMENTS 7,218,432 B2   5/2007  Ichii et al.
7,443,558 B2  10/2008  Sakai et al.
(Continued)

FOREIGN PATENT DOCUMENTS

EP   2944986 A1   11/2015
EP   2945000 A1   11/2015
(Continued)

OTHER PUBLICATIONS

Extended Search Report dated Nov. 23, 2018 in European Patent Application No. 17750017.0, 13 pages.
(Continued)

*Primary Examiner* — Kenneth B Lee, Jr.
(74) *Attorney, Agent, or Firm* — Xsensus LLP (57) ABSTRACT

An image display device includes a display unit configured to display a display image and to use a color information target value as a color information value of a display color, the display color being a color of the displayed image; and a first image correction unit configured, in a case where the color information value of the display color of the display image obtained by capturing the display image displayed by the display unit is different from the color information target value, to correct the color information value of the display color of the displayed image displayed by the display unit, so that the color information value of the display color of the display image obtained by capturing the display image displayed by the display unit becomes the color information target value.

13 Claims, 9 Drawing Sheets

(51) Int. Cl.
*B60R 11/02* (2006.01)
*H04N 9/31* (2006.01)
*G02B 26/10* (2006.01)
*G09G 3/00* (2006.01)
*G09G 5/02* (2006.01)
*G09G 5/39* (2006.01)
*G09G 5/06* (2006.01)
*G09G 3/34* (2006.01)
*H04N 9/64* (2006.01)

(52) U.S. Cl.
CPC ......... *G02B 27/0101* (2013.01); *G09G 3/002* (2013.01); *G09G 3/346* (2013.01); *G09G 5/024* (2013.01); *G09G 5/026* (2013.01); *G09G 5/06* (2013.01); *G09G 5/39* (2013.01); *H04N 9/3129* (2013.01); *H04N 9/3155* (2013.01); *H04N 9/3164* (2013.01); *H04N 9/3182* (2013.01); *H04N 9/3194* (2013.01); *H04N 9/64* (2013.01); *H04N 9/643* (2013.01); *G02B 2027/0112* (2013.01); *G09G 2340/14* (2013.01); *G09G 2380/10* (2013.01)

(56) References Cited

U.S. PATENT DOCUMENTS

| | | |
|---|---|---|
| 7,545,547 B2 | 6/2009 | Hayashi et al. |
| 7,554,708 B2 | 6/2009 | Sakai et al. |
| 7,672,032 B2 | 3/2010 | Hayashi et al. |
| 7,738,007 B2 | 6/2010 | Ichii et al. |
| 7,940,292 B2 | 5/2011 | Hayashi et al. |
| 7,956,884 B2 | 6/2011 | Ichii |
| 8,018,637 B2 | 9/2011 | Ichii |
| 8,081,203 B2 | 12/2011 | Masuda et al. |
| 8,089,553 B2 | 1/2012 | Suzuki et al. |
| 8,094,179 B2 | 1/2012 | Ichii |
| 8,115,794 B2 | 2/2012 | Yoshii et al. |
| 8,179,414 B2 | 5/2012 | Sato et al. |
| 8,223,418 B2 | 7/2012 | Ichii et al. |
| 8,441,512 B2 | 5/2013 | Tatsuno et al. |
| 8,670,472 B2 | 3/2014 | Tatsuno et al. |
| 8,755,716 B2 | 6/2014 | Ichii |
| 8,767,029 B2 | 7/2014 | Ichii |
| 8,773,489 B2 | 7/2014 | Ichii |
| 8,913,098 B2 | 12/2014 | Shibayama et al. |
| 8,929,412 B2 | 1/2015 | Tatsuno et al. |
| 9,348,134 B2 | 5/2016 | Ichii |
| 2014/0253579 A1 | 9/2014 | Babaguchi |
| 2015/0219803 A1 | 8/2015 | Inamoto et al. |
| 2016/0116735 A1 | 4/2016 | Hayashi et al. |
| 2016/0266384 A1 | 9/2016 | Nakamura et al. |
| 2016/0320615 A1 | 11/2016 | Nakamura et al. |
| 2016/0320616 A1 | 11/2016 | Ichii |
| 2017/0011709 A1 | 1/2017 | Kuwabara et al. |

FOREIGN PATENT DOCUMENTS

| | | | |
|---|---|---|---|
| EP | 2945001 A1 | 11/2015 | |
| EP | 3006988 A1 | 4/2016 | |
| EP | 3012681 A1 | 4/2016 | |
| EP | 3 118 047 A1 | 1/2017 | |
| EP | 3118047 A1 * | 1/2017 | ............ B60K 35/00 |
| JP | 2005-138801 | 6/2005 | |
| JP | 2008-067080 | 3/2008 | |
| JP | 2009-258205 | 11/2009 | |
| JP | 2013-122600 | 6/2013 | |
| JP | 2013-246236 | 12/2013 | |
| JP | 2014-172406 | 9/2014 | |
| JP | 2014-240967 | 12/2014 | |
| JP | 2015-022158 | 2/2015 | |
| JP | 2015-041039 | 3/2015 | |
| JP | 2015-145962 | 8/2015 | |
| JP | 2015-232691 | 12/2015 | |
| JP | 2015-232692 | 12/2015 | |
| JP | 2015-232693 | 12/2015 | |
| JP | 2016-075881 | 5/2016 | |
| JP | 2016-110027 | 6/2016 | |
| JP | 2016-136222 | 7/2016 | |
| WO | WO 2015/136874 A1 | 9/2015 | |

OTHER PUBLICATIONS

International Search Report dated Mar. 7, 2017 in PCT/JP2017/000854 filed on Jan. 12, 2017.

Written Opinion dated Mar. 7, 2017 in PCT/JP2017/000854 filed on Jan. 12, 2017.

* cited by examiner

| COLOR | OBTAINED VALUES | CORRECTION COLOR |
|---|---|---|
| RED | RGB (n, 0, 0) | RGB ($r_1$, $g_1$, $b_1$) |
| YELLOW | RGB (n, n, 0) | RGB ($r_2$, $g_2$, $b_2$) |
| GREEN | RGB (0, n, 0) | RGB ($r_3$, $g_3$, $b_3$) |
| BLUE | RGB (0, 0, n) | RGB ($r_4$, $g_4$, $b_4$) |
| PURPLE | RGB (n/2, 0, n) | RGB ($r_5$, $g_5$, $b_5$) |
| WHITE | RGB (n, n, n) | RGB ($r_6$, $g_6$, $b_6$) |

# IMAGE DISPLAY DEVICE AND IMAGE DISPLAY METHOD

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2017/000854 filed on Jan. 12, 2017, which is based upon and claims the benefit of priority of Japanese Patent Application No. 2016-023027 filed on Feb. 9, 2016, the entire contents of which are hereby incorporated by reference.

BACKGROUND OF THE INVENTION

1. Field of the Invention

The present invention relates to an image display device and an image display method.

2. Description of the Related Art

When a head-up display (referred to as an "HUD", below) device is used as a driving assistant device for displaying information of a host vehicle and navigation on the windshield of the vehicle, the HUD provides a higher safety than conventional car navigation devices because the HUD requires fewer viewpoint movements. Among HUDs, a laser-based HUD device has a particularly higher visibility thanks to a higher contrast of a displayed image and a greater number of reproducible colors.

[Patent Literature] Japanese Unexamined Patent Publication No. 2014-172406

SUMMARY OF THE INVENTION

According to an embodiment of the present invention, an image display device includes a display unit configured to display a display image and to use a color information target value as a color information value of a display color, the display color being a color of the displayed image; and a first image correction unit configured, in a case where the color information value of the display color of the display image obtained by capturing the display image displayed by the display unit is different from the color information target value, to correct the color information value of the display color of the displayed image displayed by the display unit, so that the color information value of the display color of the display image obtained by capturing the display image displayed by the display unit becomes the color information target value.

DETAILED DESCRIPTION OF THE PREFERRED EMBODIMENTS

An embodiment according to the present invention controls an automotive HUD device such that RGB values of a display color as a color of a display image actually displayed on a windshield by the automotive HUD device, match the RGB target values of the display color of the display image, to improve visibility of a viewer such as the driver.

Since it is possible to cause the color information value of a display color of a display image actually displayed by the image display device to match the color information target value, the visibility of the viewer can be improved.

In the following, embodiments of the present invention will be described with reference to the drawings. In the following embodiments, substantially the same components are assigned the same reference codes, and duplicate explanation is omitted.

Figure 1:
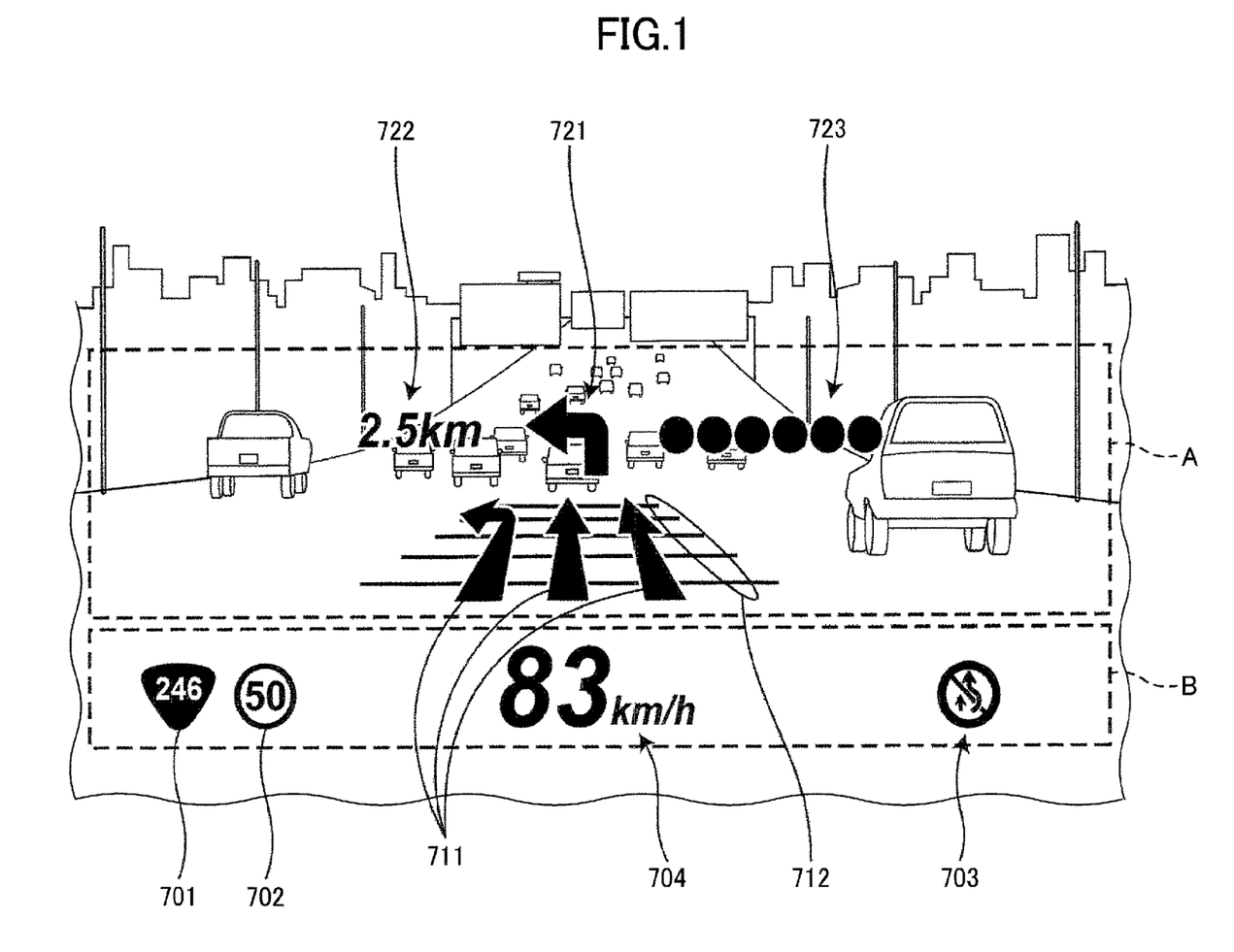
FIG. 1 is a front view illustrating an example of a virtual image displayed by an automotive HUD device 200 according to an embodiment of the present invention, which is overlapped with a scene ahead of a vehicle 301 viewed by a driver 300 through a windshield 302.
Figure 2:
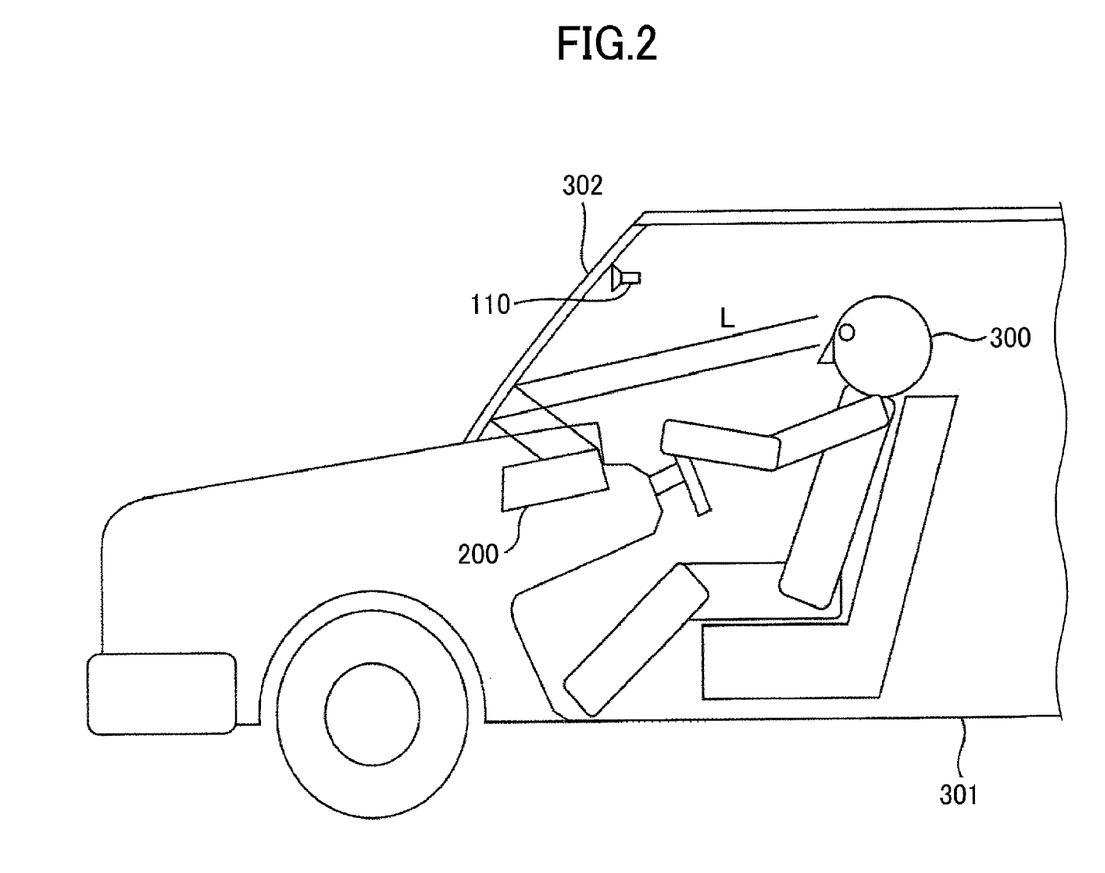
FIG. 2 is a schematic, partially cutaway side view schematically illustrating an example of an interior arrangement of a vehicle equipped with the automotive HUD device 200 according to the embodiment.
Figure 3:
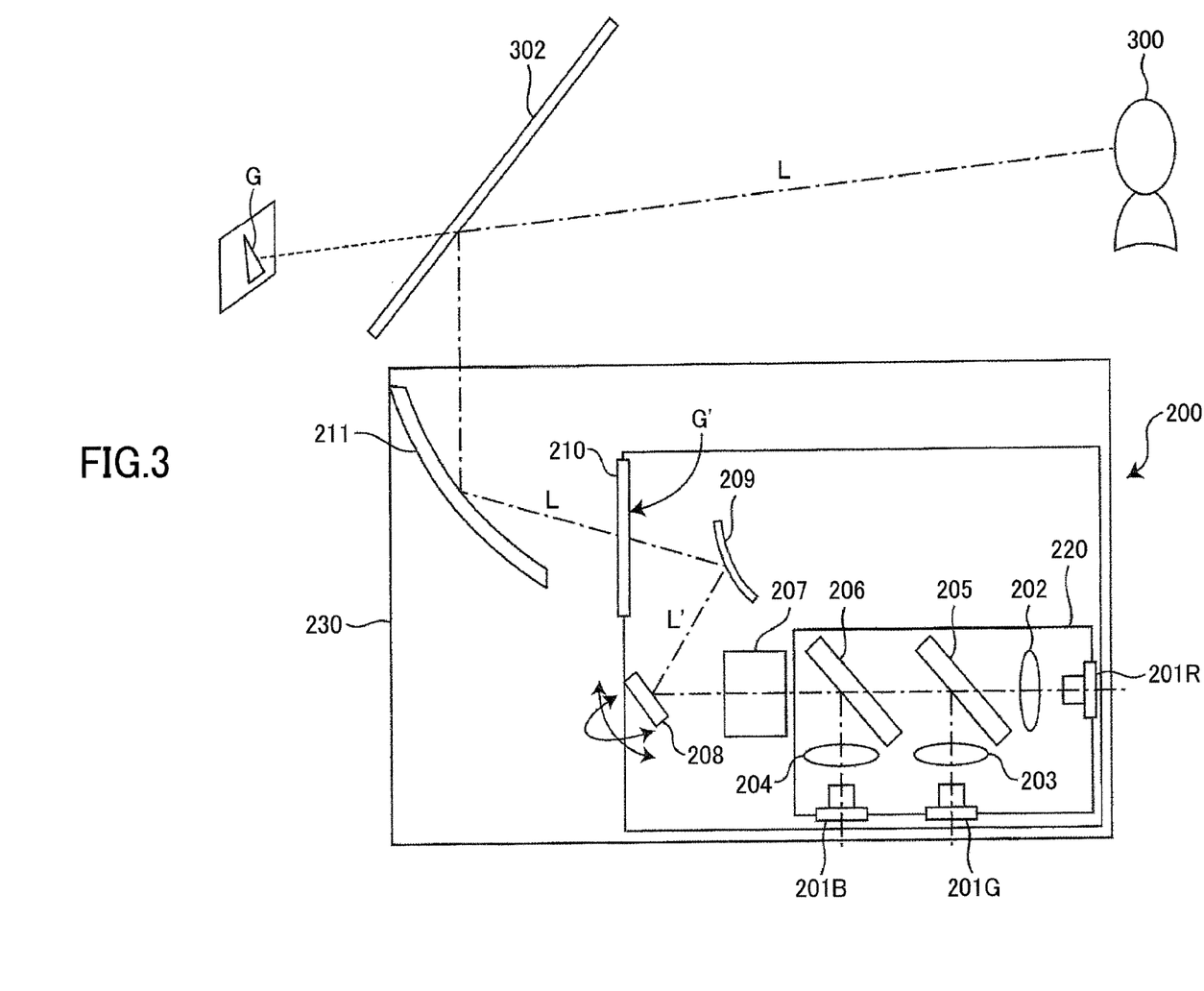
FIG. 3 is a block diagram schematically illustrating an example of an internal configuration of an optical system 230 of the automotive HUD device 200 in FIG. 2.

FIG. 1 is a front view illustrating an example of a virtual image displayed by an automotive HUD device 200 (referred to as an "HUD device 200", below) according to an embodiment of the present invention, which is overlapped with a scene ahead of a vehicle 301 viewed by a driver 300 through a windshield 302; FIG. 2 is a schematic, partially cutaway side view schematically illustrating an example of an interior arrangement of a vehicle equipped with the HUD device 200 according to the embodiment; and FIG. 3 is a block diagram schematically illustrating an example of an internal configuration of an optical system of the HUD device 200 in FIG. 2. Note that the HUD device 200 is an example of an image display device.

In FIG. 2, the HUD system 200 according to the embodiment is installed, for example, in the dashboard of the host vehicle 301 which is a traveling body as an example of a moving body. Projection light L, which is image light emitted from the HUD device 200 in the dashboard, is reflected on the windshield 302 as an example of a light transmitting member, toward the driver 300 as a viewer. This enables the driver 300 to visually recognize a navigation image or the like, which will be described later, as a virtual image G. Note that a combiner as a light transmitting member may be provided on the inner wall surface of the windshield 302 so that the driver visually recognizes a virtual image by the projection light L reflected by the combiner.

In the embodiment, the optical system of the HUD device 200 and the like are designed so that the distance from the driver 300 to the virtual image G is 5 m or longer. In a conventional general automotive HUD device, the distance from the driver to the virtual image G has been around 2 m. Normally, the driver is watching closely a point at infinity ahead of the vehicle or is watching closely a preceding vehicle several ten meters ahead. In the case where the driver who has been focusing on a distant point attempts to visually recognize a virtual image G at 2 m away, the greatly changing focal length change requires the driver to move the crystalline lenses of the eyeballs considerably. This may lead to a case where, for the driver, the time to focus on the virtual image G becomes longer, the time to recognize contents of the virtual image G becomes longer, and further, the eyeballs of the driver 300 tend to get tired more easily. Furthermore, a case may be considered where it becomes difficult for the driver to notice the contents of the virtual image G, and consequently, it becomes difficult to provide proper information to the driver by the virtual image G.

If the distance from the driver 300 to the virtual image G is 5 m or longer as in the embodiment, the amount of movement of the crystalline lens of the eyeball is reduced as compared with the conventional case, the time to focus on the virtual image G is shortened, and thereby, the driver 300 can recognize the contents of the virtual image G earlier. In addition, tiredness of the eyeballs of the driver 300 can be reduced. Furthermore, it becomes easier for the driver to notice the contents of the virtual image G, and it becomes easier to provide information to the driver by the virtual image G. If the distance from the driver 300 to the virtual image G is 5 m or longer, the driver 300 can focus on the virtual image G with virtually no vergence movement of the eyeballs. Therefore, the effect of the motion parallax that causes the driver 300 to perceive the sense of distance (a change in the perceived distance) and the sense of depth (a difference in the perceived distance), can be prevented from weakening due to vergence movements of the eyeballs. Therefore, the information perception effect of the driver 300 taking advantage of the sense of distance and the depth of the image can be effectively exhibited.

The HUD device 200 in FIG. 3 includes, in an optical system 230, red, green, and blue laser light sources 201R, 201G, and 201B; collimator lenses 202, 203, and 204 provided for the respective laser light sources; and two dichroic mirrors 205 and 206. The HUD device 200 further includes a light quantity adjuster 207; an optical scanner 208; a free-form surface mirror 209; a microlens array 210 as a light emitting member; a projection mirror 211 as a light reflecting member. As a light source unit 220 according to the embodiment, the laser light sources 201R, 201G, and 201B, the collimator lenses 202, 203 and 204, and the dichroic mirrors 205 and 206 are contained as a unit in an optical housing.

As the laser light sources 201R, 201G and 201B, LD (semiconductor laser devices) can be used. The wavelength of a luminous flux emitted from the red laser light source 201R is, for example, 640 nm; the wavelength of a luminous flux emitted from the green laser light source 201G is, for example, 530 nm; and the wavelength of a luminous flux emitted from the blue laser light source 201B is, for example, 445 nm.

The HUD device 200 according to the embodiment projects an intermediate image formed on the microlens array 210 onto the windshield 302 of the host vehicle 301 so that an enlarged image of the intermediate image is visually recognized as a virtual image G by the driver 300. The color laser lights emitted from the laser light sources 201R, 201G, and 201B are made as substantially parallel lights by the collimator lenses 202, 203, and 204, respectively, and synthesized by the two dichroic mirrors 205 and 206. The synthesized laser light is adjusted in the light quantity by the light quantity adjuster 207, and then, deflected by the mirror of the optical scanner 208, to scan over the free-form surface mirror 209 two-dimensionally. A scanning light L' deflected by the optical scanner 208 to scan over the free-form surface mirror 209 two-dimensionally is reflected on the free-form surface mirror 209 so that the distortion is corrected, and then, converged on the micro lens array 210 to form an intermediate image.

Note that in the embodiment, although the microlens array 210 is used as a light emitting member that individually emits the luminous flux of each pixel of the intermediate image (one point of the intermediate image), another light emitting member may be used instead. Also, as a method of forming an intermediate image G', a method that uses a liquid crystal display (LCD) or a vacuum fluorescent display (VFD) may be adopted. However, in the case of displaying a large virtual image G with a high brightness, the laser scanning system as in the embodiment is preferred.

Further, in a method using a liquid crystal display (LCD), a vacuum fluorescent display (VFD), or the like, in a non-image part of an image display area as a range for displaying a virtual image G (i.e., a blank part where an image is not displayed), light is irradiated slightly, and it is difficult to block such light completely. Therefore, a case may be considered in which the visibility of a scene ahead of the host vehicle 301 through the non-image part becomes worse. On the other hand, according to the laser scanning method as in the embodiment, the laser light sources 201R, 201G and 201B can be turned off with respect to a non-image part in an image display area; this enables to completely prevent irradiation of light to the non-image part. Therefore, it is possible to avoid a situation where the visibility of a scene ahead of the host vehicle 301 through the non-image part is lowered by the light irradiated from the HUD device 200, and thereby, it is possible to avoid a lowered visibility of the scene ahead.

In addition, in the case where the brightness of a warning image for giving a warning or the like to the driver is increased stepwise to strengthen the degree of warning, a display control is executed such that only the brightness of the warning image among various images being displayed is increased stepwise. The laser scanning method is also preferable in such a case where the display control is executed such that the brightness is partially increased for a part of the images in this way. In a method using a liquid crystal display (LCD), a vacuum fluorescent display (VFD), or the like, a case may be considered in which the brightness is also increased for images other than the warning image that are being displayed. For this reason, it may not be possible to widen the brightness difference between the warning image and the other images. This may lead to a case where the effect of strengthening the degree of warning by increasing the brightness of the warning image stepwise cannot be obtained sufficiently.

The optical scanner 208 tilts the mirror in the main scanning direction and the sub-scanning direction by a publicly known actuator driving system such as MEMS (Micro Electro Mechanical Systems), and deflects the laser light incident on the mirror, to scan (raster-scan) the free curved surface mirror 209 two-dimensionally. Drive control of the mirror is executed in synchronization with the light emission timing of the laser light sources 201R, 201G, and 201B. Note that the configuration of the optical scanner 208 is not limited to the above configuration. For example, instead, it is also possible to use a mirror system consisting of two mirrors that swing or rotate around two mutually orthogonal axes, respectively.

Figure 4:
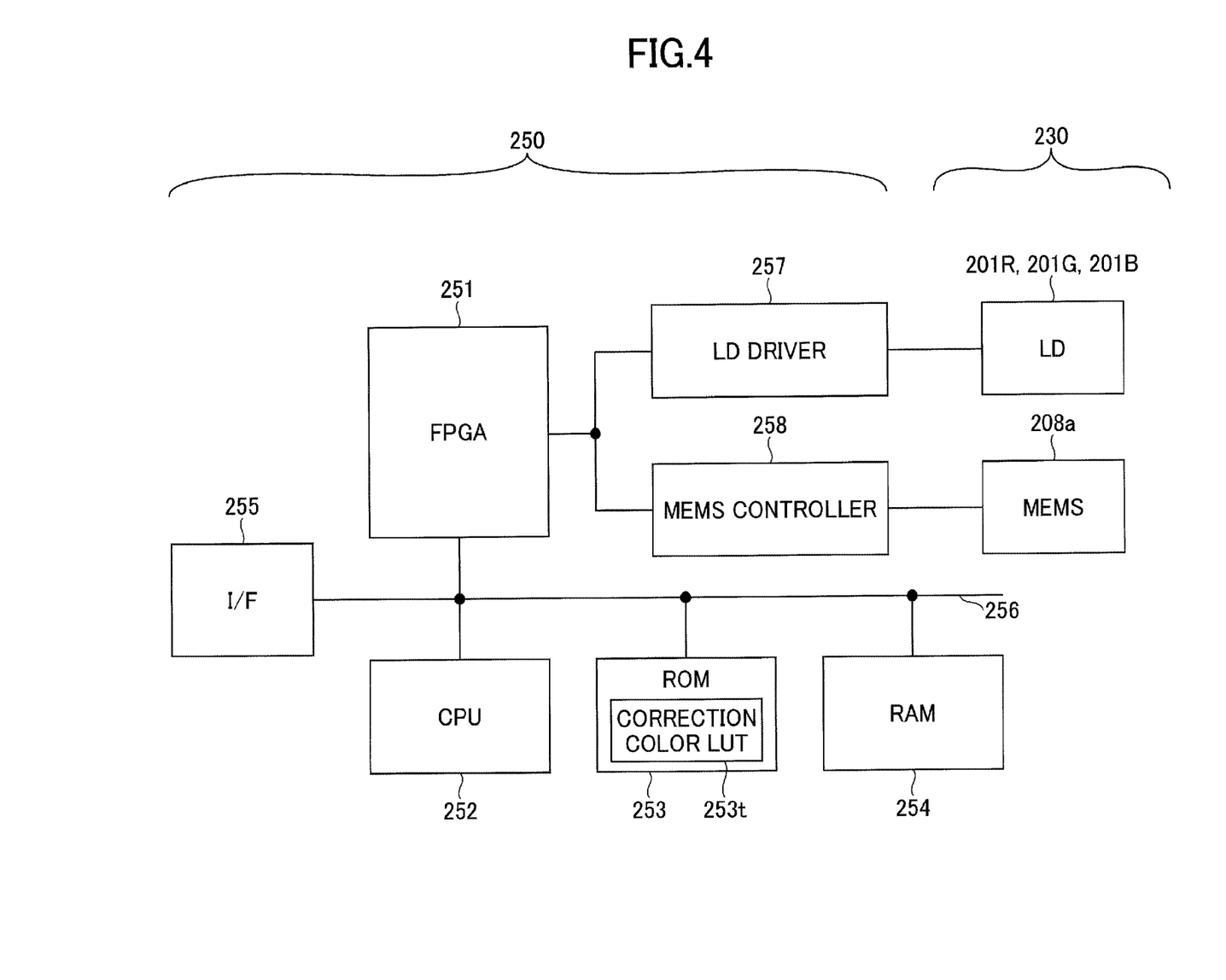
FIG. 4 is a block diagram illustrating an example of an internal configuration of a control system 250 of the automotive HUD device 200 in FIG. 2.

FIG. 4 is a block diagram illustrating an example of a configuration of the control system 250 of the automotive HUD device 200 in FIG. 2. In FIG. 4, the control system 250 of the HUD device 200 includes an FPGA (Field Programmable Gate Array) 251, a CPU (Central Processing Unit) 252, a ROM (Read-Only Memory) 253, a RAM (Random Access Memory) 254, an interface (referred to as "I/F", below) 255, a bus line 256, an LD driver 257, and a MEMS controller 258. The FPGA 251 causes the LD driver 257 to control operations of the laser light sources 201R, 201G, and 201B of the light source unit 220, and causes the MEMS controller 258 to control operations of MEMS 208a of the optical scanner 208. The CPU 252 implements functions of the HUD device 200. The ROM 253 stores various programs such as an image processing program executed by the CPU 252 to implement the functions of the HUD device 200. The RAM 254 is used as a work area of the CPU 252. The I/F 255 is an interface for communicating with an external controller or the like, and is connected to, for example, a vehicle navigation device 400, various sensor devices 500, and the like via a CAN (Controller Area Network) of the host vehicle 301. The I/F 255 is also connected with a forward imaging camera 110 for capturing a forward image including a display image of the HUD device 200 projected on the windshield 302, and a background image that can be seen through the windshield 302. Furthermore, the ROM 253 stores in advance a correction color lookup table (referred to as "correction color LUT", below, and described in detail later) 253t.

Figure 5:
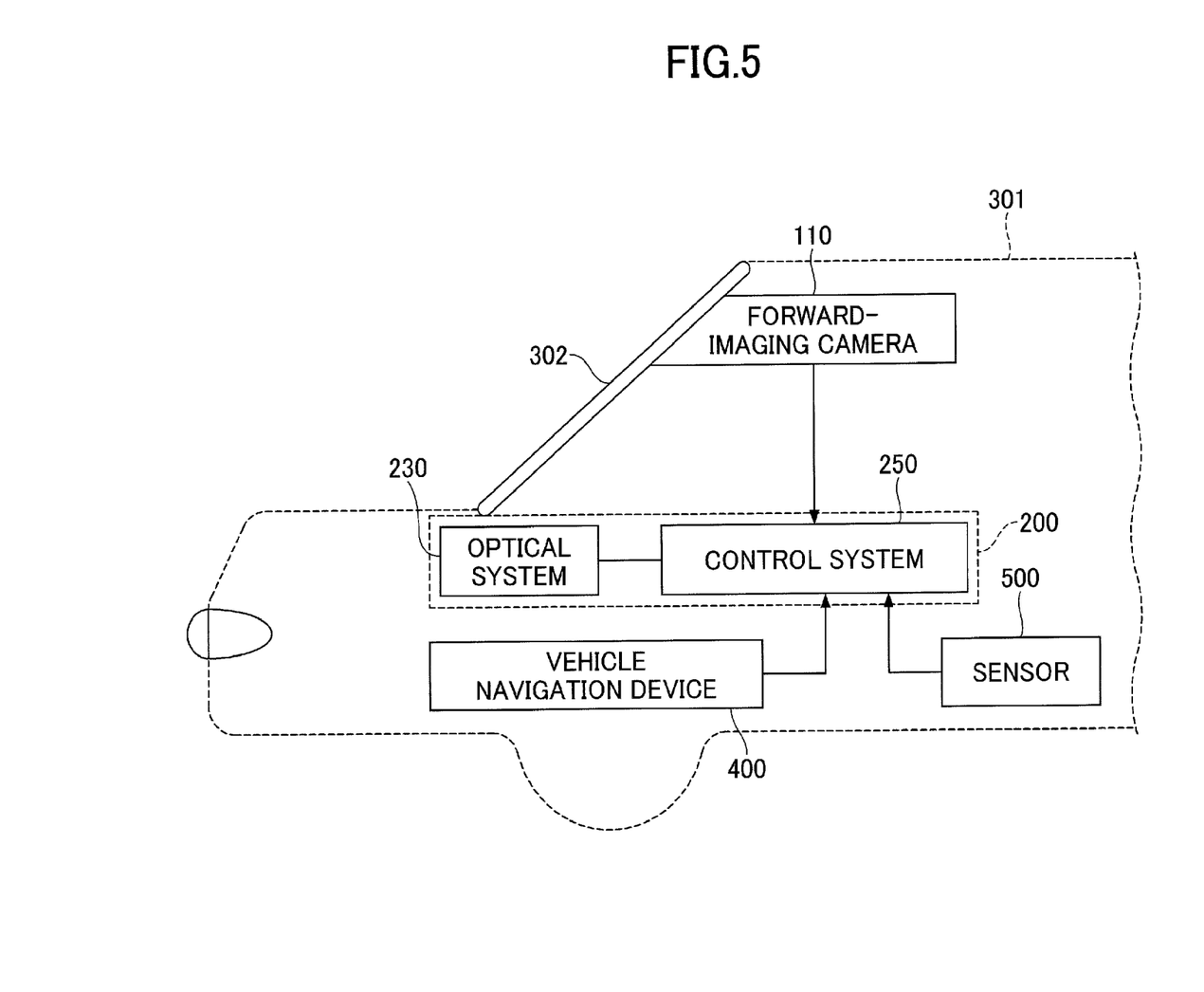
FIG. 5 is a block diagram illustrating an example of a schematic configuration of the automotive HUD device 200 and peripheral devices in FIG. 2.

FIG. 5 is a block diagram illustrating an example of a schematic configuration of the automotive HUD device 200 and peripheral devices in FIG. 2. In the embodiment, the vehicle navigation device 400, the sensor devices 500, and the like are provided as information obtaining devices to obtain provided-to-the-driver information to be provided to the driver 300 by a virtual image G. The HUD device 200 includes, as main components, the optical system 230 as an image projection device, and the control system 250 as a display control device.

As the vehicle navigation device 400 according to the embodiment, a wide variety of publicly known vehicle navigation devices to be mounted on automobiles and the like can be used. From the vehicle navigation device 400, information for generating a route navigation image to be displayed as a virtual image G is output, and this information is input into the control system 250. The information includes, for example, as illustrated in FIG. 1, the number of lanes (traveling lanes) on a road on which the host vehicle 301 is traveling, the distance to a point at which the next direction change (right turn, left turn, branching, etc.) should be made, and an image representing information such as the direction to be taken. These items of information are input from the vehicle navigation device 400 to the control system 250. As a result, the following images are displayed by the HUD device 200 under the control of the control system 250. That is, navigation images such as a traveling lane designating image 711, a following distance presenting image 712, a course designating image 721, a remaining distance image 722, an intersection name image 723, and the like are displayed in an upper image display area A.

In the image example illustrated in FIG. 1, images representing road-specific information (road name, speed limit, etc.) are displayed in a lower image display area B. The road-specific information is also input from the vehicle navigation device 400 to the control system 250. The control system 250 causes the HUD device 200 to display a road name display image 701, a speed limit display image 702, a no-passing display image 703, and the like that correspond to the road-specific information in the lower image display area B.

The sensor device 500 in FIG. 5 includes one or more sensors for detecting a variety of information indicating the behavior of the host vehicle 301, the state of the host vehicle 301, the circumstances around the host vehicle 301, and the like. From the sensor device 500, sensing information is output for generating images to be displayed as a virtual image G, and the sensing information is input into the control system 250. For example, in the image example illustrated in FIG. 1, a vehicle speed display image 704 indicating the speed of the vehicle 301 (an image of characters of "83 km/h" in FIG. 1) is displayed in the lower image display area B. On this account, the vehicle speed information included in the CAN information of the host vehicle 301 is input from the sensor device 500 to the control system 250, and under the control of the control system 250, the image of characters indicating the vehicle speed is displayed by the HUD device 200 in the lower image display area B.

In addition to the sensor for detecting the vehicle speed of the host vehicle 301, the sensor devices 500 may include the following sensors, for example:

(1) a laser radar device and/or an imaging device for detecting the distance to another vehicle, a pedestrian, a construction (guardrail, utility pole, etc.) that exists around the vehicle 301 (front, sides, and rear); and sensors for detecting external environment information (outside temperature, brightness, weather, etc.) of the host vehicle;

(2) sensors for detecting driving operations of the driver 300 (brake scanning, accelerator opening/closing, etc.);

(3) sensors for detecting the remaining fuel amount in the fuel tank of the host vehicle 301; and (4) sensors for detecting states of various in-vehicle devices such as the engine and batteries.

Transmitting such information detected by the sensor devices 500 to the control system 250 enables to cause the HUD device 200 to display the information as the virtual image G so as to be provided to the driver 300.

Next, the virtual image G displayed by the HUD device 200 will be described. The provided-to-the-driver information provided by the HUD device 200 to the driver 300 with the virtual image G in the embodiment may be any information as long as it is useful information for the driver 300. In the embodiment, the provided-to-the-driver information is roughly divided into passive information and active information.

The passive information is information that is passively recognized by the driver 300 at a timing when a predetermined information provision condition is satisfied. Therefore, information provided to the driver 300 at a timing set by the HUD device 200 is included in the passive information, and information having a certain relationship between the timing to provide the information and the content of the information to be provided is also included in the passive information.

Examples of the passive information include information relating to the safety while driving, route navigation information, and the like. The information relating to the safety while driving includes information on the following distance (a following distance presenting image 712) between the host vehicle 301 and a preceding vehicle 350, information on emergency related to driving (warning information such as information urging the driver to perform an emergency operation, attention calling information, etc.) and the like. Also, the route navigation information is information for guiding the driver through the travel route to a destination set in advance, which may be similar to information provided to the driver by publicly known vehicle navigation devices. The route navigation information includes traveling lane designating information (a traveling lane designating image 711) that designates a traveling lane to be traveled at the nearest intersection; direction change operation designating information that designates a directional change operation at an intersection or a branch point where the course should be changed from the straight-ahead direction; and the like. The course change operation designating information includes route designating information (a route designating image 721) to designate one of the routes that should be taken at an intersection or the like, remaining distance information to an intersection or the like at which a course change operation will be performed (a remaining distance image 722), and name information of an intersection or the like (an intersection name image 723).

The active information is information that is actively recognized by the driver 300 at a timing determined by the driver 300. The active information is information that can be provided to the driver at any timing when desired by the driver 300; for example, information having a low relationship between the timing at which the information is provided and the content of the information to be provided, or information having no such relationship is included in the active information. Since the active information is information obtained by the driver 300 any timing when desired by the driver 300, it is information that continues to be displayed for a certain period of time or displayed all the time. For example, information specific to a road on which the host vehicle 301 is traveling, the vehicle speed information of the host vehicle 301 (a vehicle speed display image 704), the current time information, and the like can be listed. Examples of the information specific to a road include the road name information (a road name display image 701), regulation content information such as the speed limit of the road and the like (a speed limit display image 702, a no-passing display image 703, etc.), and any other information related to the road that is useful for the driver 300.

In the embodiment, the passive information and the active information that are roughly divided in this way are displayed on respective image display areas where a virtual image is displayed. Specifically, in the embodiment, the two image display areas A and B are arranged adjoiningly in the vertical direction; among these areas, a passive information image corresponding to the passive information is mainly displayed in the upper image display area A, an active information image corresponding to the active information is mainly displayed in the lower image display area B. Note that in the case of displaying a part of the active information images in the upper image display region A, the part is displayed such that priority is given to the visibility of the passive information images displayed on the upper image display region A.

Also, in the embodiment, a stereoscopic image presented by using a stereoscopic vision is used as a virtual image G to be displayed. Specifically, as the following distance presenting image 712 and the traveling lane designating image 711 displayed in the upper image display area A, perspective images presented in perspective are used.

More specifically, a perspective image constructed by the perspective projection is used for the following distance presenting image 712 in which the lengths of the five horizontal lines constituting the following distance presenting image 712 become shorter when closer to the upper side so that the image appears as directing toward one vanishing point. In particular, in the embodiment, the vehicle distance presentation image 712 is displayed such that the vanishing point is located in the vicinity of a point to which the driver 300 pays attention, so that the driver 300 while driving can perceive the sense of depth of the following distance presenting image 712 more easily. Furthermore, in the embodiment, the perspective image is used in which the thickness of the horizontal lines becomes narrower toward the upper side, or the brightness of the horizontal lines becomes lower toward the upper side. This enables the driver 300 while driving to perceive the sense of depth of the following distance presenting image 712 even more easily.

The HUD device 200 according to the embodiment displays a color that is different from the background color and the display color of the display image and has a good visibility, on the surroundings of the display image displayed by the HUD device 200, or on the entire surface of the image display area excluding the display image.

A first feature of the HUD device 200 according to the embodiment is as follows. That is, from information on a display color of a display image captured by the forward imaging camera 110, and on a display color commanded to be displayed, the HUD device 200 determines whether there is a difference between both display colors (whether the driver 300 can recognize a difference between both display colors), to control the display color by correcting the display command so as to eliminate the difference in color between the both (Steps S1 to S5 in FIG. 8). As a result, the display color of a virtual image to be actually displayed by the HUD device 200 is controlled to match the display color originally commanded to be displayed in the HUD device 200, and thereby, it is possible to improve the visibility of the viewer.

A second feature of the HUD device 200 according to the embodiment is as follows. That is, the HUD device 200 determines whether RGB values of a background color, which is a color in the background of a display image displayed by the HUD device 200, is similar to RGB values of a display color of a display image. As a result, if the both are similar (or match each other), with reference to the correction color LUT 253*t*, the HUD device 200 corrects the display color on the surroundings of the display image, or on the entire surface of the image display area excluding the display image, to a correction color having RGB values that are neither similar to the RGB values of the background color nor the RGB values of the display color (Steps S6 to S9 in FIG. 8). This enables the display color to remain unchanged even in the case where the background color in the background of the display image is the same color as the display color of the display image that may represent a specific meaning, and thereby, enables to cause the driver 300 to correctly recognize the meaning specific to the display color of the display image.

As described above, it is possible to improve the visibility of a display image sensed by the driver as the viewer. That is, when the background color of the background display color is compared with the display image of the display image, if it is determined that a specific condition is satisfied, a color that is different from the background color and the display color of the display image and has a good visibility, is displayed on the surroundings of the display image, or on the entire surface of the image display area excluding the display image. As a result, the display color of the display image itself can remain unchanged, and thereby, it is possible to cause the driver 300 to correctly recognize the meaning specific to the display image.

Figure 6:
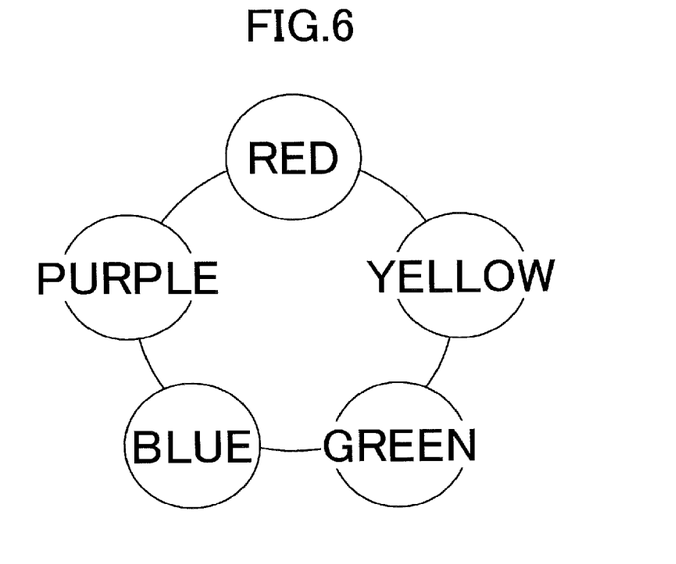
FIG. 6 is an explanatory diagram for describing a relationship between a Munsell hue circle and RGB values.

FIG. 6 is an explanatory diagram for describing a relationship between a Munsell hue circle and RGB values. In FIG. 6, the Munsell hue circle has colors arranged in a circle, and each color has a complementary color relationship with a color located most distantly. Based on this, it is possible to obtain a complementary color of a background color. In FIG. 6, although five representative colors are presented, an interval between the colors may be divided more finely to have several stages.

Figure 7:
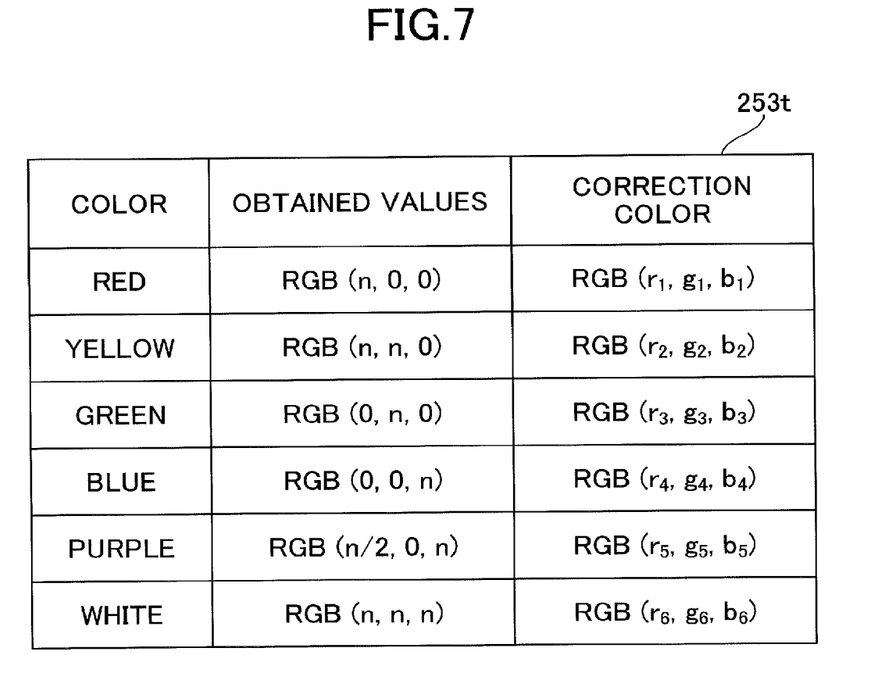
FIG. 7 is a diagram illustrating an example of a correction color lookup table in FIG. 4.

FIG. 7 is a table illustrating an example of the correction color LUT 253t in FIG. 4. The correction color LUT 253t in FIG. 7 is prepared in advance by using relationships of opposite colors or complementary colors in the Munsell hue circle in FIG. 6, to be stored in the ROM 253 in FIG. 4. In the correction color LUT 253t in FIG. 7, in addition to the five colors in FIG. 6, information on six colors including white whose complementary color cannot be represented is represented by using RGB values using n representing an integer among 0 to 255, and is associated with corresponding RGB values of a correction color as a defeated color or a complementary color. RGB values as a combination of discretionally selected numerical values can bring a color difference as well as a luminosity difference.

Note that similar to the case in FIG. 6, the colors to be stored in the correction color LUT 253t may be divided more finely to have several stages between the colors, or the same color may be divided more finely based on the luminosity. A correction color may be determined by using complementary color relationships that use the Munsell hue circle in FIG. 6, or a color that has a high visibility and does not have a complementary color relationship may be selected. As the correction color of white, a color may be selected that has RGB values other than those supposed to be used as the RGB values of a background color, or to have RGB values that are not used in a display image. Other than the above, values to be stored in the corrected color LUT 253t may include values whose change enables recognition of a change of a color, such as the light quantity of the light source, the light quantity ratio, the electric current value settings for controlling the light quantity, and the like.

In the following, storage examples or use examples of correction colors that can be applied in the embodiment will be described.

First Storage Example or Use Example of Correction Color

In the correction color LUT 253t, as a correction color of red having the RGB values of (n, 0, 0), white having the RGB values of (m, m, m) or blue-green being a complementary color having the RGB values of (0, p, p) is used. Here, m and p are numbers each selected discretionarily among 0 to 255, to improve the visibility of the color. For example, when a display color having the RGB values of (255, 0, 0) is compared with a background color having the RGB values of (255, 0, 0), both colors can be classified as red having the RGB values of (n, 0, 0), to be regarded as the same color. As a result, on the surroundings of the display image, or on the entire surface of the image display area 101 excluding the display image, a correction color that has, for example, the RGB values of (255, 255, 255) of white, the RGB values of (0, 255, 255) of green, or the like is displayed.

Second Storage Example or Use Example of Correction Color

For example, from the viewpoint that even for colors belonging to the same hue, the driver 300 can recognize the difference as long as the luminosity differs, the RGB values are not corrected particularly in the case where the display color of a display image belongs to the same hue as the background color in a background image. That is, in the correction color LUT 253t, multiple sets of RGB values of (n, 0, 0) belonging to the same hue are stored, which include RGB values of R1(255, 0, 0) of red and RGB values of R2 (200, 0, 0) of red. Moreover, assume a case where, for example, RGB values of (250, 0, 0) of a display color are compared with RGB values of (210, 0, 0) of a background color (Step S7 in FIG. 8). In this case, at Step S7, RGB values of (250, 0, 0) of the display color are classified as red having the RGB values of R1(255, 0, 0) because of close numerical values in the correction color LUT 253t, the background color is classified as red having the RGB values of R2(200, 0, 0) because of close numerical values, and thereby, both colors are determined as not similar (NO at Step S7), and correction of the RGB values at Step S8 and Step S9 are skipped.

Third Storage Example or Use Example of Correction Color

For example, when storing the correction color of white having the RGB values of (n, n, n) in the correction color LUT 253t, a color having RGB values other than the RGB values of (m, 0, 0) is stored as the correction color, in the case where colors having the RGB values of (m, 0, 0) of red are included considerably in all display images and background images.

Fourth Storage Example or Use Example of Correction Color

When a display image is compared with a background image and the RGB values of both turn out to be similar (or to match each other), a display color having the RGB values that are different from those of the background color and the display color is displayed on the surroundings, on the inside, or on the outside part of the display image. For example, in the case where there exists a non-image part in a display image (i.e., a blank part on which displaying is not executed by the HUD device 200), displaying a correction color on the non-image part increases the visibility of the non-image part. Also, in the case where the display image has another display image adjoined on the outside, the part on which the correction color is displayed is adjusted so as not to overlap the other display image. Also, in the case where the display image has no display image on the outside, a correction color is displayed on the outside part of the displayed image (e.g., the display image is surrounded by a part on which the correction color is displayed (see the right lower diagram in FIG. 10)). In such a case and there exists a non-image in the display image, by not changing the display color of the non-image part, it is possible to prevent the driver from erroneously recognizing the meaning of the color of the display image.

Fifth Storage Example or Use Example of
Correction Color

When a display image is compared with a background image and the RGB values of the both turn out to be similar (or to match each other), on the surroundings of the display image, or on the entire surface of the image display area excluding the display image, a color is displayed that has the RGB values different from those of the background color and the display color, and is not included in all of the display images and the background images (i.e., a color that has the RGB values other than those included in all of the display images and the background images). Defining in advance a color not included in all of the display images and the background images as the correction color enables to prevent the driver from erroneously recognizing the meaning of the correction color.

Sixth Storage Example or Use Example of
Correction Color

In the case where there is no color difference between a display color and a background color, and there is no brightness difference between the display image and the background image, on the surroundings of the display image, or on the entire surface of the image display area excluding the display image, a color is displayed that has a brightness difference with the background color and with the display color. As a correction color to be stored in the correction color LUT 253t, a color having a brightness difference in addition to a color difference is included. In the case of representing in RGB values, for example, even when colors have the same ratios of m:n:p for the R value, the G value, and the B value, if the absolute values are different, the brightness is different. In the case where there is no color difference and no brightness difference between a display color and a background color, on the surroundings of the display image, or on the entire surface of the image display area excluding the display image, displaying a color with which a difference from the background color can be recognized enables to display the correction color in the same hue as the display color, and hence, enables to prevent the driver from erroneously recognizing the meaning of the correction color.

Figure 8:
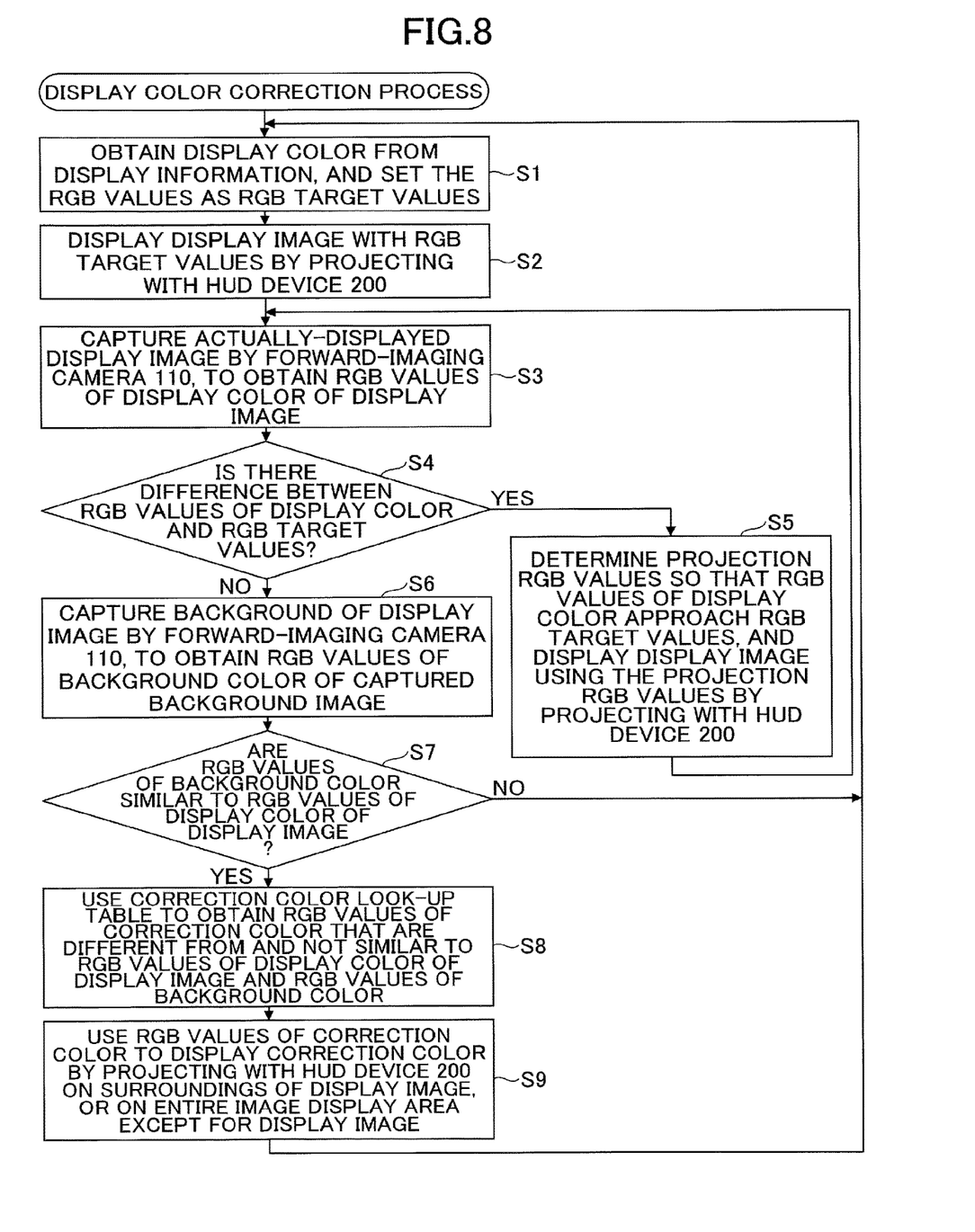
FIG. 8 is a flowchart illustrating an example of a display color correction process executed by the control system 250 of the automotive HUD device 200 in FIG. 4.

FIG. 8 is a flowchart illustrating an example of a display color correction process executed by the control system 250 in FIG. 4.

At Step S1 in FIG. 8, the control system 250 obtains RGB values of a display color to be designated in a display command from display information to be displayed by the HUD device 200, and sets the obtained RGB values as RGB target values. At Step S2, the control system 250 uses the RGB target values to display the display information as a display image on the windshield 302 by projecting the image with the HUD device 200. Note that at Step S1, RGB values of a display color obtained from the display information to be displayed by the HUD device 200 are set as the RGB target values, the present invention is not limited as such. RGB target values may be obtained by calculation based on RGB values of a display color obtained from the display information to be displayed by the HUD device 200.

Next, at Step S3, the control system 250 causes the forward-imaging camera 110 to capture the display image actually projected and displayed on the windshield 302 by the HUD device 200, to obtain RGB values of the display color from the captured display image. At Step S4, the control system 250 determines whether there is a difference between the RGB values of the display color of the captured display image obtained at Step S3, and the RGB target values obtained at Step S1 (different from each other or not). If the determination result is YES (i.e., there is a difference between the both), the control system 250 proceeds to Step S5, or proceeds to Step S6 if it is NO.

At Step S5, the control system 250 corrects the RGB values of the display image projected by the HUD device 200 (in FIG. 8 "projection RGB values") so that the RGB values of the display color of the captured display image approach the RGB target values, uses the corrected RGB values to display the display image on the windshield 302 by projecting the image with the HUD device 200, and returns to Step S3. In the correction of the RGB values described above, for example, the RGB values of the display image projected by the HUD device 200 are changed in a direction in which the RGB values of the display color of the captured display image approach the RGB target values, and then, the process returns from Step S5 to Step S3 to repeat the control loop of Steps S3 to S4. In this way, the control system 250 causes RGB values of a display color of a display image actually visible to the driver 300 to substantially match the RGB target values within a predetermined allowable error range.

At Step S6, the control system 250 causes the forward-imaging camera 110 to capture the background of the display image actually projected and displayed by the HUD device 200, which can be actually seen through the windshield 302 (i.e., preceding vehicles, the road surface, etc.). Then, the control system 250 obtains the RGB values of a background color as the color of the captured background image. Next, at Step S7, the control system 250 determines whether the obtained RGB values of the background color are similar to the RGB values of the display color of the captured displayed image obtained at Step S3. If the determination result is YES (i.e., the both are similar or match each other), the control system 250 proceeds to Step S8, or returns to Step S1 if it is NO.

At Step S8, the control system 250 uses the correction color LUT 253t described above to obtain RGB values of a correction color that are different from and not similar to both the RGB values of the display color of the display image obtained at Step S3, and the RGB values of the background color obtained at Step S6. Next, at Step S9, the control system 250 uses the obtained RGB values of the correction color, to project the correction color on the surroundings of the display image 102, or on the entire surface of the image display area 101 excluding the display image 102, by the HUD device 200.

At Steps S7 to S9, the RGB values of the background color are compared with the RGB values of the display color of the display image whether they are similar or not. If the both are similar (or match each other), there is a likelihood that the display image may be obscured in the background such that the driver cannot recognize the display image. Therefore, the displaying by the HUD device 200 is changed so that the display image can be recognized by the driver. That is, the RGB values of the display color or the background color of the display image are compared with the RGB values stored in the correction color LUT 253t, to obtain a correction color that is stored in the correction color LUT 253t and associated with the closest RGB values. Then, the obtained correction color is displayed on the surroundings of the display image, or on the entire surface of the image display area excluding the display image. Note that as described above, in the case of the both being similar to each other, a correction color corresponding to RGB values close to the RGB values of the display color or the background color of the display image is obtained from the correction color LUT 253*t*, in which the correction color having a relationship with a color in a Munsell hue circle as an opposite color or a complementary color is stored. Therefore, it can be considered that an opposite color or a complementary color with respect to one of the display color and the background color of the display image has a relationship of a virtually opposite or complementary color with respect to the other of the display color and the background color of the display image. Therefore, it can be considered that the correction color obtained from the correction color LUT 253*t* in this way is not similar to both the display color and the background color of the display image, and is a different color.

Figure 9:
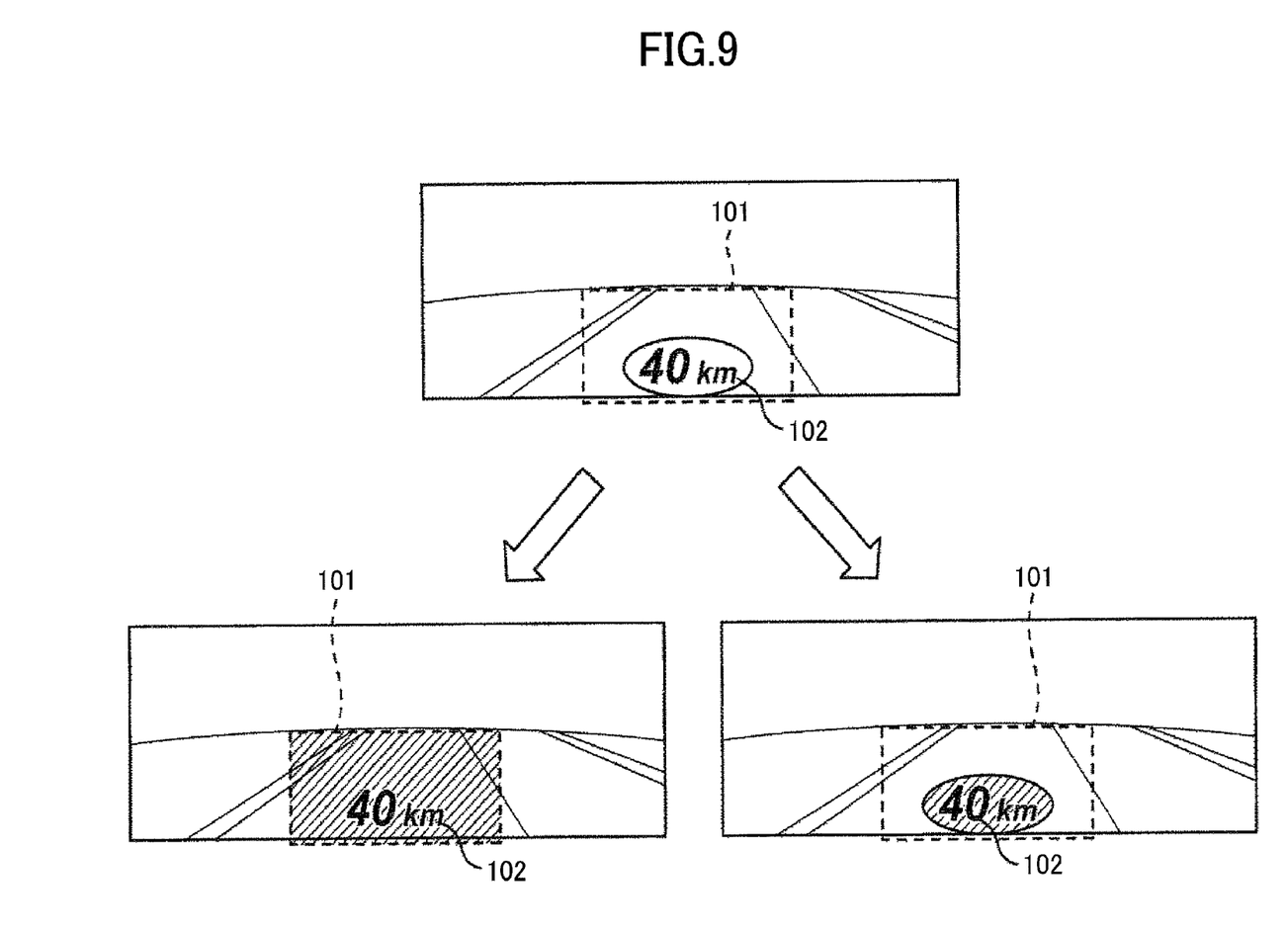
FIG. 9 includes a front view illustrating an example of a display image 102 displayed in an image display area 101 displayed by the automotive HUD device 200 in FIG. 2 when a color different from a background color is displayed on the surroundings of the display image 102, or on the entire surface of the image display area 101 excluding the display image 102.

FIG. 9 includes a front view illustrating an example of a display image 102 displayed in the image display area 101 displayed by the HUD device 200 in FIG. 2 when a color different from the background color is displayed on the surroundings of the display image 102, or on the entire surface of the image display area 101 excluding the display image 102.

In FIG. 9, in the case where the display color of the display image 102 is the same color as the background color (e.g., in the case of the both being white), on the surroundings of the display image 102 (a display example at the lower right in FIG. 9), or on the entire surface of the image display area 101 excluding the display image 102 (a display example at the lower left in FIG. 9), a color (hatching in FIG. 9) different from the background color and the display color the display image 102 is displayed. Note that for the sake of convenience, in a display example on the upper side in FIG. 9, the display color of the display image 102 (i.e., an image of characters of "40 km") is black and the background image is in white. However, in practice, for example, in the case of the both being white as described above, the image of characters being the display image 102 is also displayed in white. Therefore, in this case, in the display example on the upper side in FIG. 9, the image of characters is buried in the background and the recognition becomes difficult.

When detecting the display color of a display image 102 by using information of an image captured by the forward capturing camera 110, the control system 250 of the HUD device 200 detects the color of the display image 102 itself, and when detecting the background color, detects a color being displayed on the image display area 101 excluding the display image 102, or a color being displayed on a part in the vicinity of the display image 102. Then, in the case where the display color of the display image 102 is classified as the same as the background color, the correction color is displayed on the surroundings of the display image 102, or on the entire surface of the image display area 101 excluding the display image 102.

Figure 10:
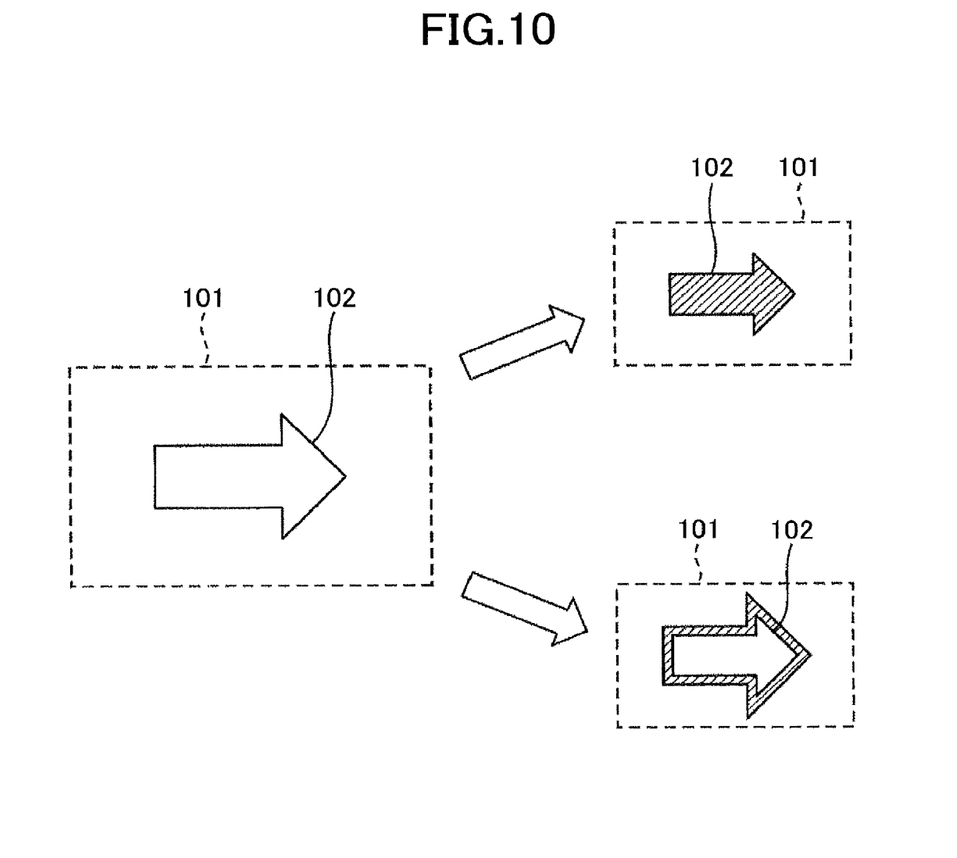
FIG. 10 includes a front view illustrating an example of a display image 102 displayed in an image display area 101 displayed by the automotive HUD device 200 in FIG. 2 when a color different from a background color is displayed on the inside or on the outside part of the display image 102.

FIG. 10 includes a front view illustrating an example of the display image 102 displayed in the image display area 101 displayed by the HUD device 200 in FIG. 2 when a color different from the background color is displayed on the inside or on the outside part of the display image 102.

For example, in the case where the display color of the display image 102 is the same color as the background color (e.g., in the case of the both being white), a color different from the background color and the display color is displayed on the inside (a display example in the upper right in FIG. 10) or on the outside part (a display example in the lower right in FIG. 10) of the display image 102. In FIG. 10, in the image display area 101, as an example, the display image 102 having the shape of an arrow is displayed. Note that for the sake of convenience, in the display example on the left side in FIG. 10, the outline of the display image 102 having the shape of an arrow is illustrated; however, such an outline does not exist in practice, and the display color is displayed on the inside. Therefore, in the case of the both being white as described above, in the display example on the left side in FIG. 10, the display image 102 in the shape of the arrow is buried in the background and the recognition becomes difficult. In the case where the display color of the display image 102 is classified as the same as the background color, a part on which the correction color is displayed may be the inside of the arrow-shaped display image 102 (the display example at the upper right in FIG. 10), or may be the outside part of the arrow-shaped display image 102 (the display example at the lower right in FIG. 10).

The meaning of the second feature of the HUD device 200 according to the embodiment described above will be described below.

Display information displayed as a display image by the HUD device includes reproductions of road signs and warnings, in which the display color of the display image plays an important role as a clue to raise the understanding level of the display information. Here, there is a likelihood that a display color of a display image under the influence of a background color of the background of the display image visible through the windshield may cause the driver to visually recognize the display color of the display image as a color shifted from the original color. In such a case, even though a specific meaning is attached to the display color, if the display color is visually recognized as a different color due to the background color, it may result in a case where the original meaning of the display color is not recognized by the driver. As a result, a case may be considered where the display color gives a misunderstanding or an unpleasant feeling to the driver, which hinders normal driving. Thereupon, the idea has been investigated that detecting a display color projected on the windshield by a camera or the like to prevent the influence of a background color enables the display color to be recognized as the original color.

If the background color is the same color as the display color (a specific case), since the display color is detected in the same way as with the original color, it is not necessary to correct the display color; in this case, however, there is a likelihood that the display image and the non-image part cannot be recognized as separate parts. For example, a case may be considered where the vehicle speed as the display information is being displayed as a white display image while the vehicle is traveling on a road surface having the background color in white such as a snowy road. In this case, by correcting the display color into a color different from the detected white background color, and displaying the corrected color, the visibility of the display information can be improved. However, in the case where a specific meaning is given to the display color itself, this method has a likelihood that the meaning of the display information cannot be correctly recognized by the driver. Also, in some cases, a likelihood may be considered that the driver may mistake the meaning given to the corrected display color for the meaning given to the original display color even though the both are different.

According to the second feature included in the HUD device 200 related to the embodiment described above, a display image is compared with a background color, and in the case where it is determined that a specific condition is satisfied, a correction color that is different from the background color and the display color is displayed on the surroundings of the display image, or on the entire surface of the image display area excluding the display image so as to increase the visibility of the boundary between the both. As a result, since the display color itself is not changed, the driver can recognize the original meaning of the display color characteristically. In other words, even in the case of the background color being the same color as the display color, the display color of the displayed image to which a specific meaning is attached can remain unchanged, and the driver can recognize the original meaning of the display color characteristically.

Patent Document 1 discloses a method of adjusting a display color to a color more visually recognizable, based on a detected background color and the original display color, for example, by mixing with a complementary color of the background color while reflecting the original display color, with an object to improve the visibility of a display image. However, there is a likelihood in the technology of Patent Document 1 that in the case where the display color has a meaning and is the same color as the background color, or in the case where the display color is corrected and a color other than the original color is displayed, the original meaning of the display color cannot be conveyed. According to the second feature included in the HUD device 200 related to the embodiment described above, since the display color itself is not changed, the original meaning of the display color can be correctly conveyed to the driver.

In the embodiments described above, although the automobile HUD device 200 has been described, the present invention is not limited as such, and can be applied to an HUD device for other vehicles or other uses, or to an image display device such as a display. In such a case, the driver is the viewer.

In the above embodiment, although RGB values are used as an example of color information values, other color information values such as luminosity coordinates may be used.

As above, the image display device and the image display method have been described with the embodiments; note that the present invention is not limited to the above embodiments, and various modifications and improvements are possible within the scope of the present invention.

What is claimed is:

1. An image display device comprising:
   a display including a head-up display configured to display a display image and to use a color information target value as a color information value of a display color, the display color being a color of the displayed image; and
   second image correction circuitry configured, in a case where a color information value of a background color being a color of a background image obtained by capturing a background of the display image displayed by the head-up display is the same as or similar to the color information value of the display color of the display image obtained by capturing the display image displayed by the head-up display, to correct a color on one of a surrounding part of the display image displayed by the head-up display, an entire surface of an image display area being a range on which the display image is displayed by the head-up display excluding the display image, an inside of the display image, and an outside part of the display image, into a correction color being a color having a color information value that is different from and not similar to the color information value of the obtained background color and the color information value of the obtained display color.

2. The image display device as claimed in claim 1, further comprising:
   first image correction circuitry configured, in a case where the color information value of the display color of the display image obtained by capturing the display image displayed by the head-up display is different from the color information target value, to correct the color information value of the display color of the displayed image displayed by the head-up display, so that the color information value of the display color of the display image obtained by capturing the display image displayed by the head-up display becomes the color information target value,
   wherein a process executed by the first image correction circuitry is executed prior to a process executed by the second image correction circuitry.

3. The image display device as claimed in claim 1, wherein as the color information value of the correction color, a color information value having a relationship of an opposite color or a complementary color with respect to the color information value of the display color or the color information value of the background color is used.

4. The image display device as claimed in claim 1, wherein when both the color information value of the display color and the color information value of the background color are color information values representing white, a color information value representing red is used as the color information value of the correction color.

5. The image display device as claimed in claim 1, wherein as the color information value of the correction color, a color information value not included in the display image and the background image is used.

6. The image display device as claimed in claim 1, wherein in a case where there is no color difference and no brightness difference between the display color and the background color, as the color information value of the correction color, a color information value representing a color having a luminosity different from a luminosity of the display color and a luminosity of the background color is used.

7. The image display device as claimed in claim 1, further comprising:
   a memory configured to store the color information value of the correction color.

8. The image display device as claimed in claim 1, wherein the head-up display is to project and display the display image on a windshield of a vehicle.

9. An image display method, the method comprising:
   a display step of displaying, on a head-up display, a display image, and using a color information target value as a color information value of a display color being a color of the displayed image; and
   a second image correction step of, in a case where a color information value of a background color being a color of a background image obtained by capturing a background of the display image displayed by the display step on the head-up display is the same as or similar to the color information value of the display color of the display image obtained by capturing the display image displayed by the display step on the head-up display, correcting a color on one of a surrounding part of the display image displayed by the display step on the head-up display, an entire surface of an image display area being a range on which the display image is displayed by the display step on the head-up display excluding the display image, an inside of the display image, and an outside part of the display image, into a correction color being a color having a color information value that is different from and not similar to the color information value of the obtained background color and the color information value of the obtained display color.

10. The image display method as claimed in claim 9, the method further comprising:
- a first image correction step of, in a case where the color information value of the display color of the display image obtained by capturing the display image displayed by the display step on the head-up display is different from the color information target value, correcting the color information value of the display color of the displayed image displayed by the display step on the head-up display, so that the color information value of the display color of the display image obtained by capturing the display image displayed by the display step on the head-up display becomes the color information target value,
- wherein the first image correction step is executed prior to the second image correction step.

11. The image display device according to claim 1, further comprising:
- a camera which performs the capturing of the background of the display image displayed by the display.

12. The method according to claim 9, further comprising:
- capturing, using a camera, the background of the display image displayed by the display.

13. The method according to claim 10, further comprising:
- capturing, using a camera, the background of the display image displayed by the display.

* * * * *